United States Patent
Kumar et al.

(10) Patent No.: US 10,200,318 B2
(45) Date of Patent: Feb. 5, 2019

(54) TASK COMPLETION IN EMAIL USING THIRD PARTY APP

(71) Applicant: Microsoft Technology Licensing, LLC, Redmond, WA (US)

(72) Inventors: Amit Kumar, Redmond, WA (US); Shajib Sadhukha, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/087,266

(22) Filed: Mar. 31, 2016

(65) Prior Publication Data

US 2016/0219003 A1 Jul. 28, 2016

Related U.S. Application Data

(63) Continuation of application No. 13/713,279, filed on Dec. 13, 2012, now Pat. No. 9,313,162.

(51) Int. Cl.
*G06F 15/16* (2006.01)
*H04L 12/58* (2006.01)
(Continued)

(52) U.S. Cl.
CPC ........... *H04L 51/046* (2013.01); *G06Q 10/02* (2013.01); *G06Q 10/107* (2013.01); *H04L 51/18* (2013.01); *H04L 67/20* (2013.01); *H04L 67/306* (2013.01)

(58) Field of Classification Search
CPC .................................................. H04L 51/046
See application file for complete search history.

(56) References Cited

U.S. PATENT DOCUMENTS

| 5,394,549 A | 2/1995 | Stringfellow et al. |
| 6,898,622 B1 * | 5/2005 | Malik .................. G06Q 10/107 709/201 |

(Continued)

FOREIGN PATENT DOCUMENTS

| CN | 101395567 | 3/2009 |
| CN | 102147898 | 8/2011 |

(Continued)

OTHER PUBLICATIONS

"Analyzing Inter-Application Communication in Android", Erika Chine, Adrienne Porter Felt, Kate Greenwood and David Wagner, Aug. 21, 2012, Proceedings: Proceedings of the 9th International Conference on Mobile Systems, Applications, and Services, 14 pgs.

(Continued)

*Primary Examiner* — Brian Whipple

(57) ABSTRACT

Among other things, one or more techniques and/or systems for providing a third party app through an email user interface are provided. That is, an email user interface may provide access to an email comprising email content (e.g., a message regarding meeting for dinner at the Emerald Tavern). The email content may be analyzed to identify an entity referenced by the email content (e.g., an Emerald Tavern entity). A user intent to accomplish a task may be determined based upon the entity. An action that may be performed to accomplish the task, and a third party app capable of performing the action may be presented through the email user interface (e.g., a restaurant reservation app capable of a reservation task). Responsive to selection of the third party app, the third party app may be executed within the email user interface without transitioning a user away from the immersive email experience.

20 Claims, 9 Drawing Sheets

(51) Int. Cl.
*G06Q 10/10* (2012.01)
*G06Q 10/02* (2012.01)
*H04L 29/08* (2006.01)

(56) References Cited

U.S. PATENT DOCUMENTS

| | | | |
|---|---|---|---|
| 7,016,855 B2 | 3/2006 | Eaton et al. | |
| 7,035,901 B1* | 4/2006 | Kumagai | G06Q 10/107 |
| | | | 705/14.54 |
| 7,233,229 B2 | 6/2007 | Stroupe et al. | |
| 7,349,920 B1 | 3/2008 | Feinberg et al. | |
| 7,363,294 B2 | 4/2008 | Billsus et al. | |
| 7,543,237 B2 | 6/2009 | Kontny et al. | |
| 7,548,895 B2 | 6/2009 | Pulsipher et al. | |
| 7,685,414 B1* | 3/2010 | Appenzeller | H04L 9/3073 |
| | | | 380/282 |
| 7,941,761 B2 | 5/2011 | Hally et al. | |
| 8,069,422 B2 | 11/2011 | Sheshagiri et al. | |
| 8,185,427 B2 | 5/2012 | Messer et al. | |
| 8,201,176 B2 | 6/2012 | Tatsubori et al. | |
| 8,375,320 B2 | 2/2013 | Kotler et al. | |
| 8,560,371 B2 | 10/2013 | Levitt et al. | |
| 8,587,793 B2 | 11/2013 | Naito et al. | |
| 8,990,143 B2 | 3/2015 | Hohndel et al. | |
| 9,008,631 B2 | 4/2015 | Small et al. | |
| 9,111,291 B2 | 8/2015 | Lempel et al. | |
| 9,122,542 B1 | 9/2015 | Nelissen | |
| 9,313,162 B2 | 4/2016 | Kumar et al. | |
| 9,460,422 B2 | 10/2016 | Reter et al. | |
| 9,832,149 B2* | 11/2017 | Uraizee | H04L 51/08 |
| 2002/0010746 A1* | 1/2002 | Jilk, Jr. | G06F 17/3089 |
| | | | 709/206 |
| 2002/0061741 A1 | 5/2002 | Leung et al. | |
| 2003/0220937 A1 | 11/2003 | Maeoka et al. | |
| 2004/0059712 A1 | 3/2004 | Dean | |
| 2004/0249709 A1 | 12/2004 | Donovan | |
| 2005/0108074 A1 | 5/2005 | Bloechl et al. | |
| 2005/0132010 A1* | 6/2005 | Muller | G06Q 10/107 |
| | | | 709/206 |
| 2005/0192992 A1 | 9/2005 | Reed et al. | |
| 2005/0267770 A1 | 12/2005 | Banavar et al. | |
| 2005/0268303 A1 | 12/2005 | Anderson et al. | |
| 2005/0268306 A1 | 12/2005 | Anspach et al. | |
| 2005/0289470 A1 | 12/2005 | Pabla | |
| 2006/0069666 A1 | 3/2006 | Burke et al. | |
| 2006/0149677 A1 | 7/2006 | Shahine | |
| 2006/0282298 A1 | 12/2006 | Azvine et al. | |
| 2007/0027732 A1 | 2/2007 | Hudgens | |
| 2008/0005108 A1* | 1/2008 | Ozzie | G06F 17/30867 |
| 2008/0005168 A1 | 1/2008 | Huff et al. | |
| 2008/0034315 A1 | 2/2008 | Langoulant et al. | |
| 2008/0086640 A1* | 4/2008 | Voss | H04L 51/00 |
| | | | 713/171 |
| 2008/0126961 A1 | 5/2008 | Naaman et al. | |
| 2008/0178110 A1 | 7/2008 | Hill et al. | |
| 2009/0025013 A1 | 1/2009 | Hattori | |
| 2009/0089133 A1 | 4/2009 | Johnson et al. | |
| 2009/0111425 A1 | 4/2009 | Forbes et al. | |
| 2009/0150761 A1 | 6/2009 | Sawicki et al. | |
| 2009/0239552 A1 | 9/2009 | Churchill et al. | |
| 2010/0031198 A1 | 2/2010 | Zimmerman et al. | |
| 2010/0037222 A1 | 2/2010 | Tatsubori et al. | |
| 2010/0125548 A1 | 5/2010 | Anzai et al. | |
| 2010/0169176 A1 | 7/2010 | Turakhia | |
| 2010/0223575 A1 | 9/2010 | Leukart et al. | |
| 2010/0257015 A1 | 10/2010 | Molander | |
| 2011/0045841 A1 | 2/2011 | Kuhlke et al. | |
| 2011/0131285 A1 | 6/2011 | Liao | |
| 2011/0145823 A1 | 6/2011 | Rowe et al. | |
| 2011/0276396 A1 | 11/2011 | Rathod | |
| 2011/0276896 A1 | 11/2011 | Zambetti et al. | |
| 2011/0283230 A1 | 11/2011 | Gnanasambandam et al. | |
| 2012/0095815 A1 | 4/2012 | Glaser | |
| 2012/0144281 A1 | 6/2012 | Schechter | |
| 2012/0159536 A1 | 6/2012 | Treacy et al. | |
| 2012/0191694 A1 | 7/2012 | Gardiol | |
| 2012/0197977 A1 | 8/2012 | Nagasaka | |
| 2012/0221384 A1 | 8/2012 | Avadhanam et al. | |
| 2012/0221975 A1 | 8/2012 | Juristovski et al. | |
| 2012/0223890 A1* | 9/2012 | Borovsky | G06F 3/04883 |
| | | | 345/173 |
| 2012/0242482 A1 | 9/2012 | Elumalai et al. | |
| 2012/0253916 A1 | 10/2012 | Ayloo | |
| 2012/0266174 A1 | 10/2012 | Inoue | |
| 2012/0278821 A1 | 11/2012 | Tran et al. | |
| 2012/0311585 A1 | 12/2012 | Gruber et al. | |
| 2013/0006689 A1 | 1/2013 | Kinnear et al. | |
| 2013/0091453 A1 | 4/2013 | Kotler et al. | |
| 2013/0117208 A1 | 5/2013 | Dousse et al. | |
| 2013/0218985 A1 | 8/2013 | Thazhmon et al. | |
| 2013/0268507 A1 | 10/2013 | Macbeth et al. | |
| 2013/0282755 A1 | 10/2013 | Procopio et al. | |
| 2013/0311285 A1 | 11/2013 | Abrol et al. | |
| 2013/0311997 A1 | 11/2013 | Gruber et al. | |
| 2013/0346247 A1 | 12/2013 | Bash et al. | |
| 2013/0346981 A1 | 12/2013 | Johnson et al. | |
| 2014/0033071 A1 | 1/2014 | Gruber et al. | |
| 2014/0081690 A1 | 3/2014 | Winters | |
| 2014/0082521 A1 | 3/2014 | Carolan et al. | |
| 2014/0089822 A1 | 3/2014 | Wu et al. | |
| 2014/0101599 A1 | 4/2014 | Gandhi et al. | |
| 2014/0130060 A1 | 5/2014 | Pope et al. | |
| 2014/0172986 A1* | 6/2014 | Kumar | G06Q 10/107 |
| | | | 709/206 |
| 2014/0173602 A1 | 6/2014 | Kikin-Gil et al. | |
| 2014/0173625 A1 | 6/2014 | Kumar et al. | |
| 2014/0317027 A1 | 10/2014 | Elumalai et al. | |
| 2014/0337175 A1 | 11/2014 | Katzin | |
| 2014/0365951 A1 | 12/2014 | Fernandes et al. | |
| 2015/0006564 A1 | 1/2015 | Tomkins et al. | |
| 2015/0095268 A1 | 4/2015 | Greenzeiger et al. | |
| 2015/0100503 A1 | 4/2015 | Lobo et al. | |
| 2015/0118672 A1 | 4/2015 | Yeskel et al. | |
| 2015/0242091 A1 | 8/2015 | Lu et al. | |
| 2015/0269508 A1 | 9/2015 | Damboritz et al. | |
| 2016/0071064 A1 | 3/2016 | Itani et al. | |
| 2016/0086116 A1 | 3/2016 | Rao et al. | |
| 2016/0094499 A1* | 3/2016 | Uraizee | H04L 51/08 |
| | | | 715/752 |
| 2016/0161280 A1 | 6/2016 | Shahine et al. | |
| 2016/0180279 A1 | 6/2016 | Koerner et al. | |
| 2016/0219003 A1 | 7/2016 | Kumar et al. | |
| 2016/0379175 A1 | 12/2016 | Bhattacharya et al. | |
| 2017/0193835 A1 | 7/2017 | Bonney-ache et al. | |
| 2018/0129371 A1 | 5/2018 | Fowler et al. | |
| 2018/0129993 A1 | 5/2018 | Fowler et al. | |
| 2018/0129994 A1 | 5/2018 | Fowler et al. | |
| 2018/0129995 A1 | 5/2018 | Fowler et al. | |
| 2018/0130007 A1 | 5/2018 | Fowler et al. | |

FOREIGN PATENT DOCUMENTS

| | | |
|---|---|---|
| CN | 102253860 | 11/2011 |
| CN | 102521317 | 6/2012 |
| CN | 102737303 | 10/2012 |
| JP | 2000-029945 | 1/2000 |
| WO | WO 97/42568 | 11/1997 |
| WO | WO 9472568 | 11/1997 |
| WO | 2010/010967 | 1/2012 |
| WO | 2012/167168 | 12/2012 |

OTHER PUBLICATIONS

"Announcing the OpenID Backplane Protocol Work Group", Greg Keggstra, Aug. 21, 2012, reprinted from the Internet at: http://openid.net/2012/08/21/announcing-the-open id-backplane-protocol-work-group/, 8 pgs.

"AppContracts and Extensions" (Windows Store Apps), Oct. 15, 2012, reprinted from the Internet at: http://msdn.microsoft.com/en-us/library/windows/apps/hh464906.aspx, 4 pgs.

(56) References Cited

OTHER PUBLICATIONS

"iOS App Programming Guide", Sep. 19, 2012, reprinted from the Internet at: http://developer.apple.com/library/ios/documentation/iphone/conceptual/iphoneosprogrammingguide/iPhoneAppProgrammingGuide.pdf, 144 pgs.

Abrams, Lawrence, "How to open a file with a different program on your Mac", Bleepingcomputer.com, Oct. 1, 2011, 3 pgs.

Conder, Shane et al., "Quick Tip: Enabling Users to Send Email from Your Android Applications—The Easy Way", Jul. 13, 2010, 34 pgs.

Dunaway, Gavin, "Yahoo! Mail Beta Uses Email Keywords for Ad Targeting"—Published Date: May 23, 2011, http:// www.adotas.com/2011/05/yahoo-mail-beta-uses-email-keywords-for-ad-targeting/.

European Communication in Application 13821242.8, dated Jul. 21, 2015, 2 pgs.

MacManus, Richard, "Gmail Ads Within Email Thread—Is This New?"—Published Date: Sep. 6, 2009, http://www. readwriteweb.com/archives/gmail_ads_within_email_thread_-_is_this_new.php.

PCT International Search Report cited in PCT Application No. PCT/US2013/075182 dated Mar. 18, 2014, 8 pgs.

Piggyback e-mail—Published Date: Feb. 11, 2005, http://www.webopedia.com/TERM/P/piggyback_e_mail.html.

U.S. Appl. No. 13/713,279, Amendment and Repsonse filed Nov. 13, 2015, 11 pgs.

U.S. Appl. No. 13/713,279, Amendment and Repsonse filed Jul. 27, 2015, 12 pgs.

U.S. Appl. No. 13/713,279, Notice of Allowance dated Dec. 7, 2015, 7 pgs.

U.S. Appl. No. 13/713,279, Office Action dated Mar. 25, 2015, 18 pgs.

U.S. Appl. No. 13/713,279, Office Action dated Aug. 13, 2015, 7 pgs.

U.S. Appl. No. 13/713,375, Amendment and Response filed Mar. 15, 2016, 13 pgs.

U.S. Appl. No. 13/713,375, Amendment and Response filed Apr. 6, 2015, 15 pgs.

U.S. Appl. No. 13/713,375, Amendment and Response filed Sep. 8, 2015, 13 pgs.

U.S. Appl. No. 13/713,375, Office Action dated Oct. 15, 2015, 17 pgs.

U.S. Appl. No. 13/713,375, Office Action dated Nov. 5, 2014, 16 pgs.

U.S. Appl. No. 13/713,375, Office Action dated Jun. 24, 2016, 18 pgs.

U.S. Appl. No. 13/713,375, Office Action dated Jun. 25, 2015, 16 pgs.

"1Calendar", http://1calendar.appappeal.com/, Published on: Aug. 17, 2011, 12 pages.

Bellotti et al., "Taking Email to Task: The Design and Evaluation of a Task Management Centered Email Tool", In Proceedings of the SIGCHI Conference on Human Factors in Computing Systems, Apr. 5, 2003, 8 pages.

Dey et al., "CybreMinder: A Context-Aware System for Supporting Reminders", In Proceedings of 2nd international symposium on Handheld and Ubiquitous Computing, Sep. 25, 2000, pp. 172-186.

Dey et al., "Towards a Better Understanding of Context and Context-Awareness", In Proceedings of 1st international symposium on Handheld and Ubiquitous Computing, Sep. 27, 1999, 12 pages.

Dube, Ryan, "Coolendar—A Cool Calendar & To-Do List in One", http://www.makeuseof.com/tag/coolendar-calendar-todo-list/, Published on: Sep. 7, 2011, 7 pages.

"Identify the Context", In Journal of IEEE Professional Communication Society, Apr. 11, 2016, 3 pages.

Lida et al., "Breadcrumb Navigation: An Exploratory Study of Usage", http://usabilitynews.org/breadcrumb-navigation-an-exploratory-study-of-usage/, Published on: Feb. 11, 2003, 6 pages.

Martin, James A., "'Handle' iOS App Mercifully Merges Email, Calendars and Tasks", http://www.cio.com/article/2875912/mobile-apps/handle-ios-app-mercifully-merges-email-calendars-and-tasks.html, Published on: Jan. 27, 2015, 3 pages.

Matteson, Scott, "Organize your Gmail Tasks using the GTasks application", http://www.techrepublic.com/blog/google-in-the-enterprise/organize-your-gmail-tasks-using-the-gtasks-application/, Published on: Apr. 12, 2013, 28 pages.

Miles, Stephanie, "Coolendar—A Better Way to Plan Ahead", http://www.appvita.com/2011/09/15/coolendar-online-scheduling-and-appointment/, Published on: Sep. 15, 2011, 3 pages.

"Remember the Milk", https://play.google.com/store/apps/details?id=com.rememberthemilk.MobileRTM&hl=en, Published on: Aug. 29, 2016, 3 pages.

"Task Management Made Delightfully Simple", https://hitask.com/, Retrieved on: Nov. 10, 2016, 5 pages.

"Ticktick—Your Lightweight Task Manager", https://ticktick.com/, Retrieved on: Nov. 10, 2016, 4 pages.

"Todoist", https://en.todoist.com/, Retrieved on: Nov. 10, 2016, 8 pages.

"Wunderlist—Keep your life in sync", https://www.wunderlist.com/, Retrieved on: Nov. 10, 2016, 5 pages.

"Wunderlist: To-Do List & Tasks", https://www.microsoft.com/en-in/store/p/wunderlist-to-do-list-tasks/9wzdncrdfxzs, Retrieved on: Nov. 10, 2016, 5 pages.

PCT International Search Report and Written Opinion Issued in PCT Application No. PCT/US2017/059812, dated Jan. 3, 2018, 12 Pages.

U.S. Appl. No. 13/713,375, Amendment and Response filed Nov. 28, 2017, 14 pages.

U.S. Appl. No. 13/713,375, Office Action dated Dec. 29, 2017, 15 pages.

U.S. Appl. No. 13/713,375, Amendment and Response filed Dec. 22, 2016, 16 pgs.

U.S. Appl. No. 13/713,375, Office Action dated Jan. 19, 2017, 16 pgs.

Williams, TY, "Setting up payment options in BlackBerry App World", Apr. 2011, obtained online at: http://helpblog.blackberry.com/2011/04/app-world-payment-options/, 4 pages.

Ongtang, M. et al., "Semantically Rich Application-Centric Security in Adndroid", The Pennsylvania State University, Dept. of Science and Engineering, 2009, 10 pages.

U.S. Appl. No. 13/713,375, Amendment and Response filed May 19, 2017, 18 pages.

U.S. Appl. No. 13/713,375, Office Action dated Jul. 28, 2017, 17 pages.

Chinese Office Action in Application 201380065290.1, dated Sep. 8, 2017, 12 pages.

Hoffman, "An Introduction to Charms in Windows 8: What they are and How to Use them", obtained online at: http://www.howtogeek.com/114341/an-introduction-to-charms-in-windows-8-what-they-ar . . . , May 2012, 8 pages.

Japanese Notice of Rejection in Application 2015-548021, dated Oct. 20, 2017, 4 pgs.

Chinese 1st Office Action in Application 201380065593.3, dated Jun. 14, 2017, 15 pages.

European Extended Search Report in Application 13818562.4, dated May 13, 2016, 8pgs.

European Office Action in Application 13818562.4, dated Oct. 18, 2017, 8 pages.

Haas, et al., "CONTASK—Using Context-Sensitive Assistance to Improve Task-Oriented Knowledge Work", Proceedings of the 12th International Conference on Enterprise Information Systems, vol. 2, 10 pages (Jun. 8, 2010).

Japanese Office Action in Application 2015-547546, dated Aug. 28, 2017, 6 pages.

PCT International Preliminary Report on Patentability in Application PCT/US2013/074697, Mailed Jun. 25, 2015, 7 Pages.

PCT International Search Report & Written Opinion for Application PCT/US2013/074697, dated Jun. 30, 2014, 10 Pages.

(56) References Cited

OTHER PUBLICATIONS

U.S. Appl. No. 13/715,434, Amendment and Response filed Dec. 26, 2014, 20 pages.
U.S. Appl. No. 13/715,434, Amendment and Response filed Dec. 28, 2016, 16 pages.
U.S. Appl. No. 13/715,434, Amendment and Response filed Apr. 4, 2016, 14 pages.
U.S. Appl. No. 13/715,434, Amendment and Response filed Aug. 24, 2015, 15 pages.
U.S. Appl. No. 13/715,434, Office Action dated Nov. 3, 2015, 28 pages.
U.S. Appl. No. 13/715,434, Office Action dated Feb. 8, 2017, 30 pages.
U.S. Appl. No. 13/715,434, Office Action dated Apr. 22, 2015, 28 pages.
U.S. Appl. No. 13/715,434, Office Action dated Jul. 28, 2016, 29 pages.
U.S. Appl. No. 13/715,434, Office Action dated Aug. 27, 2014, 24 pages.
PCT International Search Report and Written Opinion Issued in PCT Application No. PCT/US2017/059633, dated Jan. 3, 2018, 12 Pages.
PCT International Search Report and Written Opinion Issued in PCT Application No. PCT/US2017/059634, dated Jan. 3, 2018, 12 Pages.
U.S. Appl. No. 13/713,375, Amendment and Response filed Mar. 29, 2018, 14 pages.
U.S. Appl. No. 13/713,375, Supplemental Amendment and Response filed Mar. 30, 2018, 14 pages.
"Final Office Action Issued in U.S. Appl. No. 13/713,375", dated Jul. 11, 2018, 16 Pages.
"Office Action Issued in Chinese Patent Application No. 201380065290.1", dated May 3, 2018, 5 Pages.
"Office Action Issued in Chinese Patent Application No. 201380065593.3", dated Apr. 10, 2018, 11 pages.
Dixa, et al., "From the Web of Data to a World of Action", In Proceedings of the Journal of the Web Semantics: Science, Services and Agents on the World Wide Web, vol. 8, Issue 4, Nov. 1, 2010, 15 Pages.
"International Search Report and Written Opinion Issued in PCT Application No. PCT/US2017/059636", dated Jan. 8, 2018, 10 Pages.
"Non Final Office Action Issued in U.S. Appl. No. 15/450,874", dated Sep. 21, 2018, 24 Pages.

* cited by examiner

TASK COMPLETION IN EMAIL USING THIRD PARTY APP

CROSS-REFERENCE TO RELATED APPLICATIONS

This application is a continuation of application Ser. No. 13/713,279, now U.S. Pat. No. 9,313,162, filed Dec. 13, 2012 which is hereby incorporated by reference in its entirety. To the extent appropriate, the present application claims priority to the above-referenced application.

BACKGROUND

Many users communicate and/or share information through email. A computing device, such as a personal computer, a mobile device, and/or a tablet device, may host an email user interface through which a user may send, receive, read, and/or organize email. An email may comprise email content that may reference various entities, such as people, locations, businesses, consumer goods, objects, and/or other things. In an example, a subject line of an email may state "Dinner at Emerald Tavern at 5:00", which may be indicative of an Emerald Tavern entity, a dinner entity, and/or a time entity. In another example, a message body of an email may state "Do you want to go see the new Rock Group at the Music Hall next week", which may be indicative of a concert entity, a Rock Group entity, and/or a Music Hall entity. Based upon such emails, a user may set out to accomplish a task, such as a view menu task, a reserve table task, a buy tickets task, a listen to music task, etc. In this way, the user may manually leave the email user interface, open a web browser interface, and perform a web search for a particular website and/or service that may facilitate completion of the task.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing a third party app through an email user interface are provided herein. That is, an email user interface (e.g., a desktop email application, a mobile device email application, a tablet device email application, a website based email service, etc.) may provide various email functionality, such as sending, receiving, viewing, and/or organizing emails. An email may comprise email content, such as textual data associated with a message body, email metadata, a subject line, and/or other portions of the email. Email content may be analyzed to identify one or more entities referenced by the email content. For example, a work email may comprise email content "Hey Dan, we need to buy that new Printer Model Z". The email content may be parsed to identify a Printer Model Z entity and/or other entities referenced by the email content (e.g., a Dan entity, a purchase entity, etc.). A user intent to accomplish a task may be determined based upon the entity. For example, a user intent to purchase the new Printer Model Z may be determined. It may be advantageous to facilitate completion of a purchase task by the user through a third party application without transitioning away from the email experience and/or environment (e.g., facilitating the purchase task without navigating away from the email user interface).

Accordingly, an action (e.g., a purchase office product action), which may be performed to accomplish the purchase task, may be presented through the email user interface. A third party app (e.g., and/or other third party apps) capable of performing the action to accomplish the task may be presented through the email user interface. In an example, the third party app may be selected based upon supplemental content derived from a user device hosting the email user interface (e.g., a current location of the user device, which may indicate a relatively close store from which the user may pick up the Printer Model Z), a user profile (e.g., the user may have an account with a particular office product store), and/or a user preference (e.g., the user may prefer to use a particular office product store based upon the user having a coupon for the office product store).

Responsive to a selection of the third party app, the third party app may be executed within the email user interface (e.g., the third party app may be displayed within a first portion of the email user interface, while the email content and/or other email data or UI elements may be displayed within a second portion of the email user interface). The email user interface may be executed according to a user intent execution context corresponding to the entity, the email content, supplemental content, and/or the action, etc. For example, instead of merely opening the third party app to a home screen, the third party app may be opened to a purchase screen for the Printer Model Z that may be contextually relevant to the user. In this way, the user may interact with the third party app to execute the action in order to accomplish the task without leaving the email user interface, thus allowing the user to accomplish various tasks referenced by email content without transitioning away from the email experience.

In an example, the task may correspond to a threshold amount of information and/or an importance threshold. For example, a business acquisition task may entail reviewing relatively large amounts of information from multiple sources and/or may have a relatively high importance due to a large amount of money involved. Accordingly, a link to a third party app native version capable of executing outside of the email user interface (e.g., a business acquisition application configured to execute within a desktop environment, as opposed to a business acquisition app module configured to execute within the email user interface) may be provided. Responsive to a selection of the link, the user experience may be transitioned from execution of the third party app (e.g., the business acquisition app module) within the email user interface to execution of the third party app native version outside of the email user interface. User intent execution context may be passed to the third party app native version for execution (e.g., a name of the business that is to be acquired).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
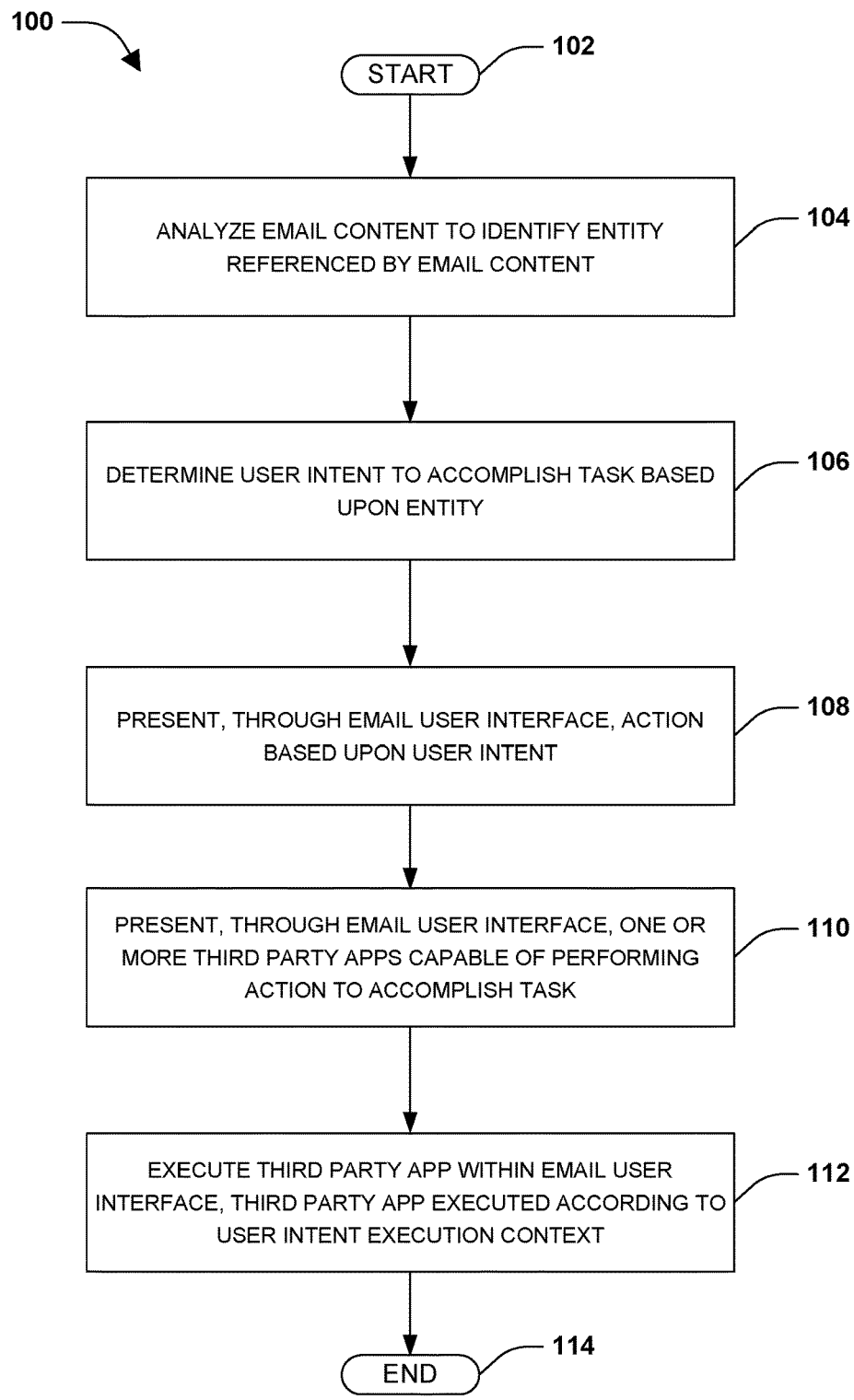
FIG. 1 is a flow diagram illustrating an exemplary method of providing a third party app through an email user interface.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of providing a third party app through an email user interface is illustrated by an exemplary method 100 in FIG. 1. At 102, the method starts. In an example, the email user interface (e.g., an email office productivity desktop application) may provide access to an email comprising email content. At 104, the email content may be analyzed (e.g., text of the email content may be parsed) to identify an entity (e.g., and/or other entities) referenced by the email content. The entity may comprise a person entity, a business entity, a consumer product entity, a time entity, a location entity, an object entity, and/or any other type of entity. For example, the email content may comprise the text "Hey Dan, we should meet tonight at the New Theater near you to watch that Holiday Movie". A New Theater entity, a Holiday Movie entity, and/or other entities (e.g., a current location entity, a friend entity, a time entity, etc.) may be identified.

At 106, a user intent to accomplish a task may be determined based upon the entity. For example, a user intent to purchase movie tickets for the Holiday Movie playing at the New Theater may be determined. In an example, the task may not comprise an email related task that may otherwise be accomplished by the email user interface. At 108, an action that may be performed to accomplish the task may be presented through the email user interface. For example, a book movie tickets action may be presented. At 110, a third party app (e.g., and/or other third party apps) capable for performing the action to accomplish the task maybe presented through the email user interface. In an example, the third party app may be selected for presentation based upon supplemental content derived from information associated with a user device hosting the email user interface (e.g., the user device may comprise a ticket reservation receipt from a particular third party app that may allow the user to confirm a prior reservation for the Holiday Movie), a user profile (e.g., the user may have an account with a particular third party app), and/or a user preference (e.g., a third party app capable of accepting payments from an online payment account may be used based upon the user having a (e.g., historical) preference to make purchases using the online payment account, as opposed to a credit card). In an example, the third party app may comprise non-email related functionality, such as booking movie tickets functionality that may not be provided by the email user interface. It may be appreciated that in an example, a third party app may comprise functionality associated with various types of tasks, such as a consumer good purchase task, a reservation task, an obtain directions task, an access digital content task (e.g., an article, a webpage, a social network profile, a text document, an image, text, audio, video, etc.), a social network task (e.g., create an event or post), obtain additional information related to an entity task (e.g., preview a book), etc.

In an example, a second user intent to accomplish a second task may be determined based upon the entity (e.g., and/or other entities identified from the email content). For example, a preview movie task for the Holiday Movie may be determined. A second action that may be performed to accomplish the second task may be presented through the email user interface (e.g., along with the action). One or more additional third party apps capable of performing the second action to accomplish the second task may be presented through the email user interface. In this way, the user may be provided with access to various actions and/or third party apps based upon the email content.

At 112, responsive to selection of the third party app (e.g., a movie app), the third party app may be executed within the email user interface (e.g., without transitioning the user away from the email user interface and/or an immersive email experience provided by the email user interface). For example, the third party app may be displayed within a first portion of the email user interface, while email content or UI elements may be displayed within a second portion of the email user interface. The third party app may be executed according to a user intent execution context corresponding to the entity, the action, the email content, supplemental content, and/or the task, etc. For example, instead of merely opening the movie app to a start screen (e.g., which may force the user to navigate through the movie app to get to movie booking functionality and/or input additional information that may have been already comprised within the email content), the movie app may be opened to a movie booking screen for the Holiday Movie at the New Theater. In an example of executing the movie app according to a user intent execution context, a parameter used to execute the action may be identified (e.g., a book movie action may have a theater name parameter, a movie time parameter, a movie name parameter, etc.). A value for the parameter may be assigned to the parameter based upon the email content (e.g., the text "Holiday Movie", "New Theater", etc.) and/or supplemental content derived from information associated with the user device (e.g., a current location), the user profile, and/or the user preference (e.g., a favorite/liked theater). The parameter may be included within the user intent execution context, and the user intent execution content may be passed to the movie app for execution.

In an example, the task may be determined as corresponding to a threshold amount of information (e.g., a movie production task that may entail gathering various images, assigning images to frames, and/or generating a movie file for release to the public) and/or an importance threshold (e.g., the movie production task may be for an unreleased movie worth a relatively large amount of money). In such a case, a user may prefer to perform the task using a third party app native version capable of executing outside of the email user interface (e.g., a desktop application, a website, a web service, a mobile app, a tablet app, an application marketplace app, and/or other apps). A link to the third party app native version may therefore be provided through the email user interface. Responsive to selection of the link, the execution of the third party app within the email user interface may be transitioned to execution of the third party app native version outside of the email user interface. In an example, the user intent execution context (e.g., a movie name parameter derived from the email content and/or supplemental content) may be passed to the third party app native version for execution (e.g., the third party app native version may be opened to a movie creation page for the new movie, which may be contextually relevant to the user). In this way, the user may accomplish the tasks through the email user interface and/or may accomplish tasks outside the email user interface based upon the user intent execution context. At 114, the method ends.

Figure 2A:
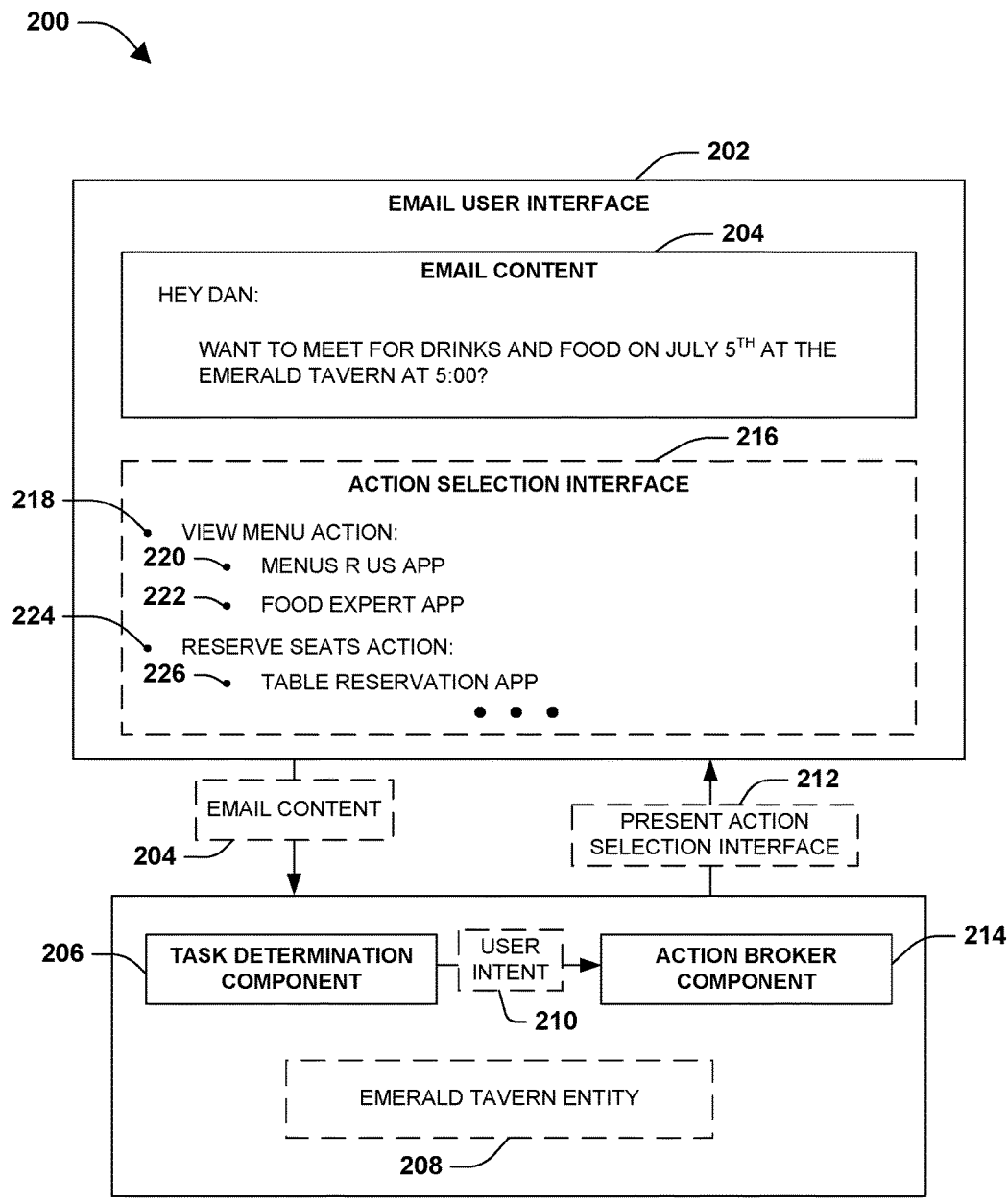
FIG. 2A is a component block diagram illustrating an exemplary system for providing a third party app through an email user interface.

FIG. 2A illustrates an example of a system 200 configured for providing a third party app through an email user interface 202. The system 200 may comprise a task determination component 206 and/or an action broker component 214. The system 200 may be associated with the email user interface 202 configured to provide access to one or more emails, such as an email comprising email content 204. The task determination component 206 may be configured to analyze the email content 204 (e.g., text of the email content 204 may be parsed) to identify one or more entities. For example, an Emerald Tavern entity 208 and/or other entities may be identified based upon the email content 204 (e.g., a person Dan entity, a food entity, a time entity, etc.). The task determination component 206 may be configured to determine a user intent 210 to accomplish one or more tasks based upon the Emerald Tavern entity 208, the email content 204, and/or supplemental content (e.g., information regarding a computing device hosting the email user interface 202, a user profile, and/or user preference data, etc.). In an example, a view menu task, a book a table task, and/or other tasks may be determined.

The action broker component 214 may be configured to identify one or more actions that may be used to accomplish the one or more tasks. For example, a view menu action 218 may be used to accomplish the view menu task, and a reserve seats action 224 may be used to accomplish the book a table task. The action broker component 214 may be configured to present the one or more actions through the email user interface 202 (e.g., presenting 212 through an action selection interface 216 hosted within the email user interface 202). The action broker component 214 may be configured to identify one or more third party apps capable of performing the one or more actions. In an example, a menus r us app 220 and a food expert app 222 may be identified as being capable of performing the view menu action 218. In another example, a table reservation app 226 may be identified as being capable of performing the reserve seats action 224. In an example of identifying a third party app, the third party app may be selected based upon supplemental content, such as information associated with the device (e.g., a third party app currently installed for use through the email user interface 202, an ability to connect to an application marketplace to download a third party app, etc.), a user profile (e.g., a user may have an account with a third party app), and/or user preference data (e.g., the user may prefer a particular third party app). In this way, the action broker component 214 may present the one or more third party apps within the email user interface 202 without transitioning a user away from an immersive email experience provided by the email user interface 202 (e.g., presenting 212 through the action selection interface 216).

Figure 2B:
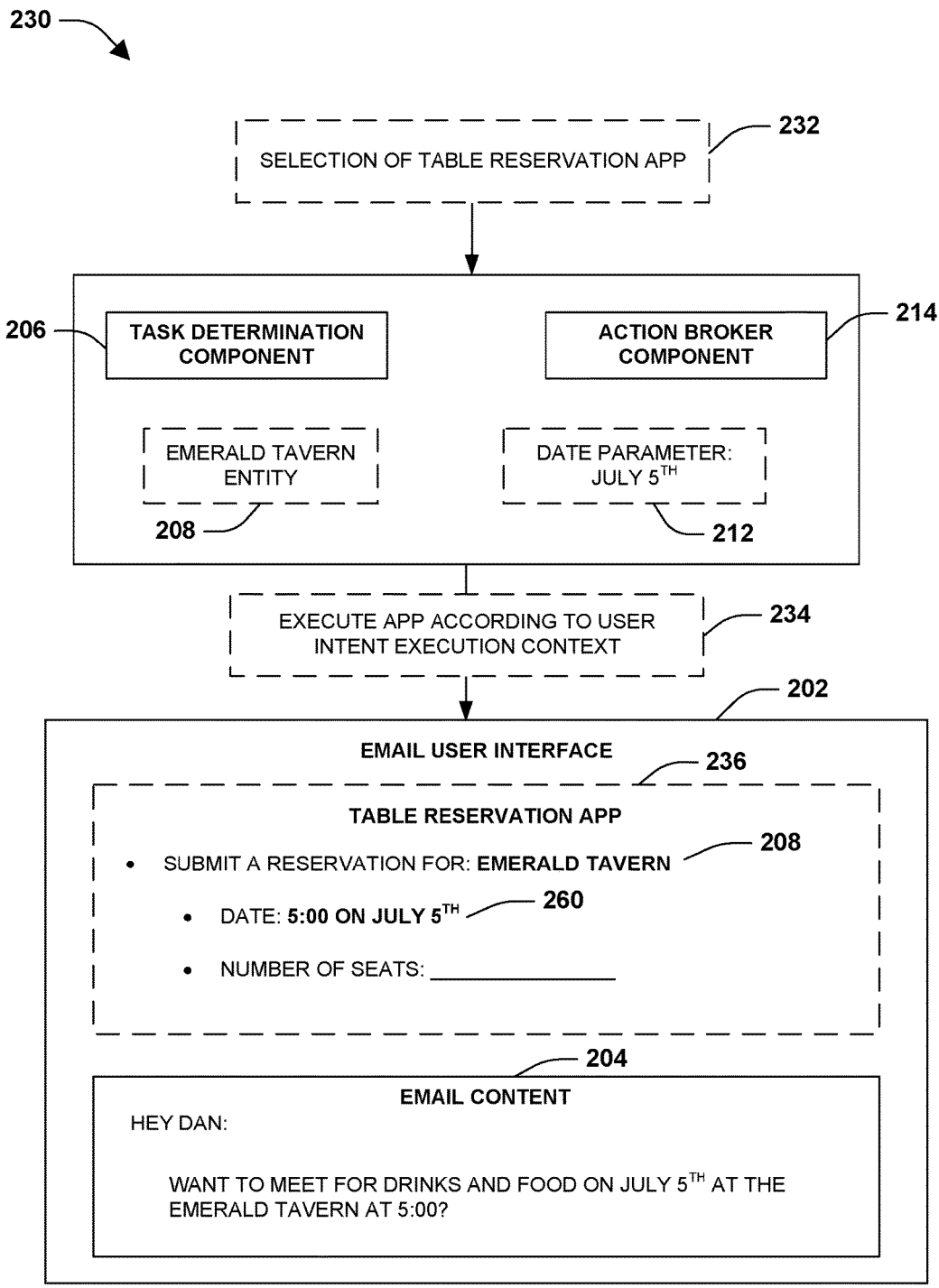
FIG. 2B is a component block diagram illustrating an exemplary system for providing a third party app through an email user interface.

FIG. 2B illustrates an example of a system 230 configured for providing a third party app through an email user interface 202. It may be appreciated that in an example, the system 230 corresponds to the system 200 of FIG. 2A. For example, the system 230 may comprise a task determination component 206 and/or an action broker component 214. The system 230 may be associated with the email user interface 202 configured to provide access to one or more emails, such as an email comprising email content 204. In an example, the task determination component 206 may have identified an Emerald Tavern entity 208 associated with the email content 204, and the action broker component 214 may have presented one or more third party apps capable of performing an action to accomplish a task associated with the Emerald Tavern entity 208.

The action broker component 214 may be configured to receive a selection 232 of a third party app presented through the email user interface 202 (e.g., a user may select a table reservation app 236, capable of performing a reserve seats action (e.g., 224 FIG. 2A), from an action selection interface (e.g., 216 FIG. 2A) displayed through the email user interface 202). The action broker component 214 may be configured to execute 234 the third party app within the email user interface 202. For example, the action broker component 214 may execute 234 a table reservation app 236 within the email user interface 202. The table reservation app 236 may be executed according to a user intent execution context corresponding to the Emerald Tavern entity 208, the reserve seats action (e.g., 224 FIG. 2A), and/or supplemental content. For example, the table reservation app 236 may utilize a restaurant name parameter, a date parameter, a number of seat parameter, and/or other parameters not illustrated in order to perform the reserve seats action (e.g., 224 FIG. 2A). A value of Emerald Tavern, identified by the Emerald Tavern entity 208, may be assigned to the restaurant name parameter, and a 5:00 on July $5^{th}$ value 260 may be assigned to the date parameter. The restaurant name parameter and the date parameter may be included within the user intent execution context. The user intent execution context may be passed to the table reservation app 236 for execution. In this way, the table reservation app 236 may be opened to a state that may be contextually relevant to the user (e.g., the table reservation app 236 may be opened to a table reservation action form having the Emerald Tavern and/or 5:00 on July $5^{th}$ already populated within the table reservation action form).

Figure 3A:
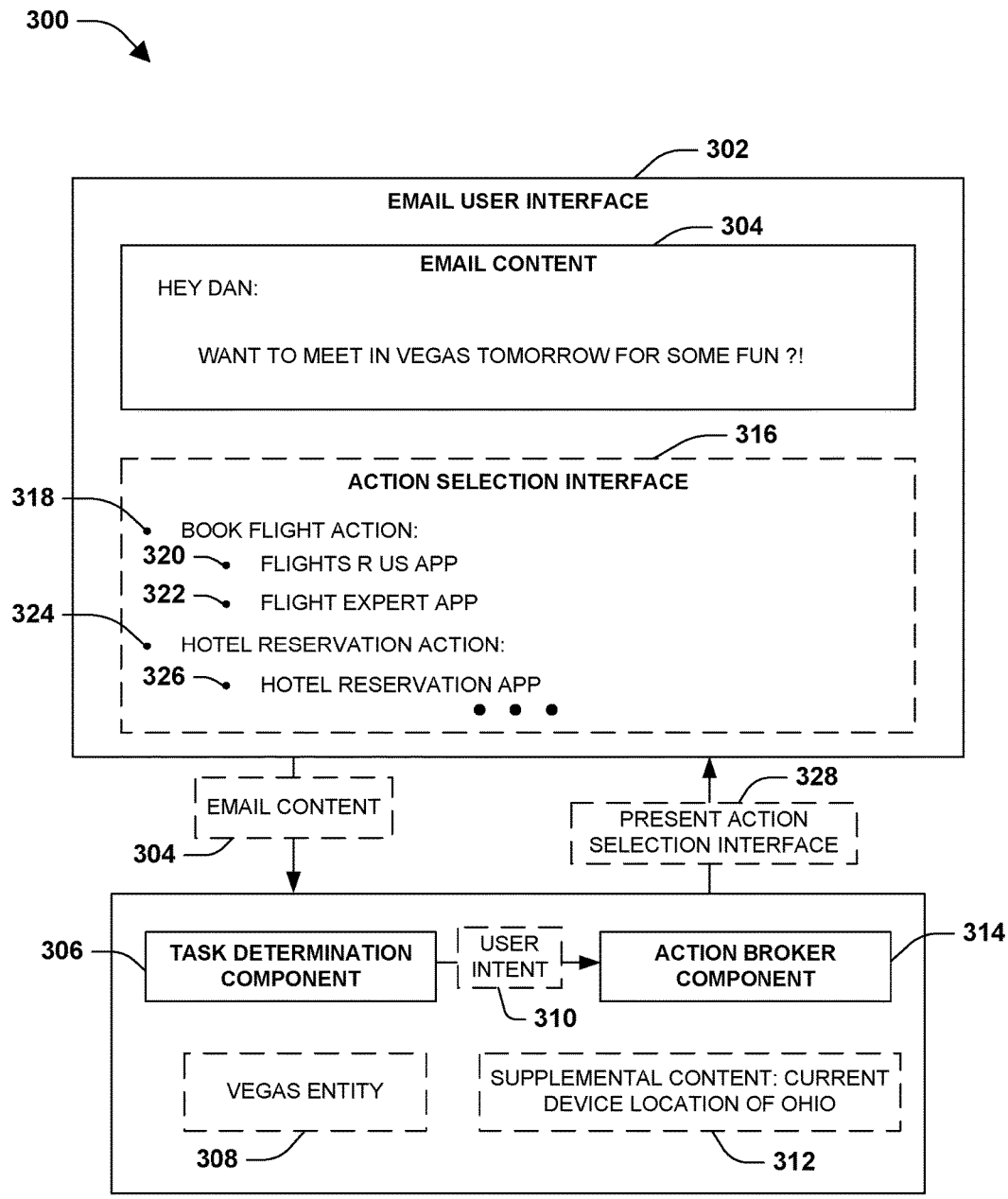
FIG. 3A is a component block diagram illustrating an exemplary system for providing a third party app through an email user interface.

FIG. 3A illustrates an example of a system 300 configured for providing a third party app through an email user interface 302. The system 300 may comprise a task determination component 306 and/or an action broker component 314. The system 300 may be associated with the email user interface 302 configured to provide access to one or more emails, such as an email comprising email content 304. The task determination component 306 may be configured to analyze the email content 304 (e.g., text of the email content 304 may be parsed) to identify one or more entities. For example, a Vegas entity 308 and/or other entities (e.g., a travel entity, an entertainment entity, a person Dan entity, a date entity, etc.) may be identified based upon the email content 304. The task determination component 306 may be configured to determine a user intent 310 to accomplish one or more tasks based upon the Vegas entity 308, the email content 304, and/or supplemental content 312 (e.g., a device hosting the email user interface may have a current location of Ohio, which may indicate that the user intent 210 may relate to booking an air flight and/or reserving a hotel as opposed to obtaining driving directions if the user was located relatively closer to Vegas). In an example, a book flight task, a hotel reservation task, and/or other tasks may be identified based upon the Vegas entity 308 and/or the supplemental content 312.

The action broker component 314 may be configured to identify one or more actions that may be used to accomplish the one or more tasks. For example, a book flights action 318 may be used to accomplish the book flight task, and a hotel reservation action 324 may be used to accomplish the hotel reservation task. The action broker component 314 may be configured to present the one or more actions through the email user interface 302 (e.g., presenting 328 through an action selection interface 316 hosted within the email user interface 302). The action broker component 314 may be configured to identify one or more third party apps capable of performing the one or more actions. In an example, a flights r us app 320 and a flight expert app 322 may be identified as being capable of performing the book flight action 318. In another example, a hotel reservation app 326 may be identified as being capable of performing the hotel reservation action 324. In this way, the action broker component 314 may present the one or more third party apps within the email user interface 302 without transitioning a user away from an immersive email experience provided by the email user interface 302 (e.g., presenting 328 through the action selection interface 316).

Figure 3B:
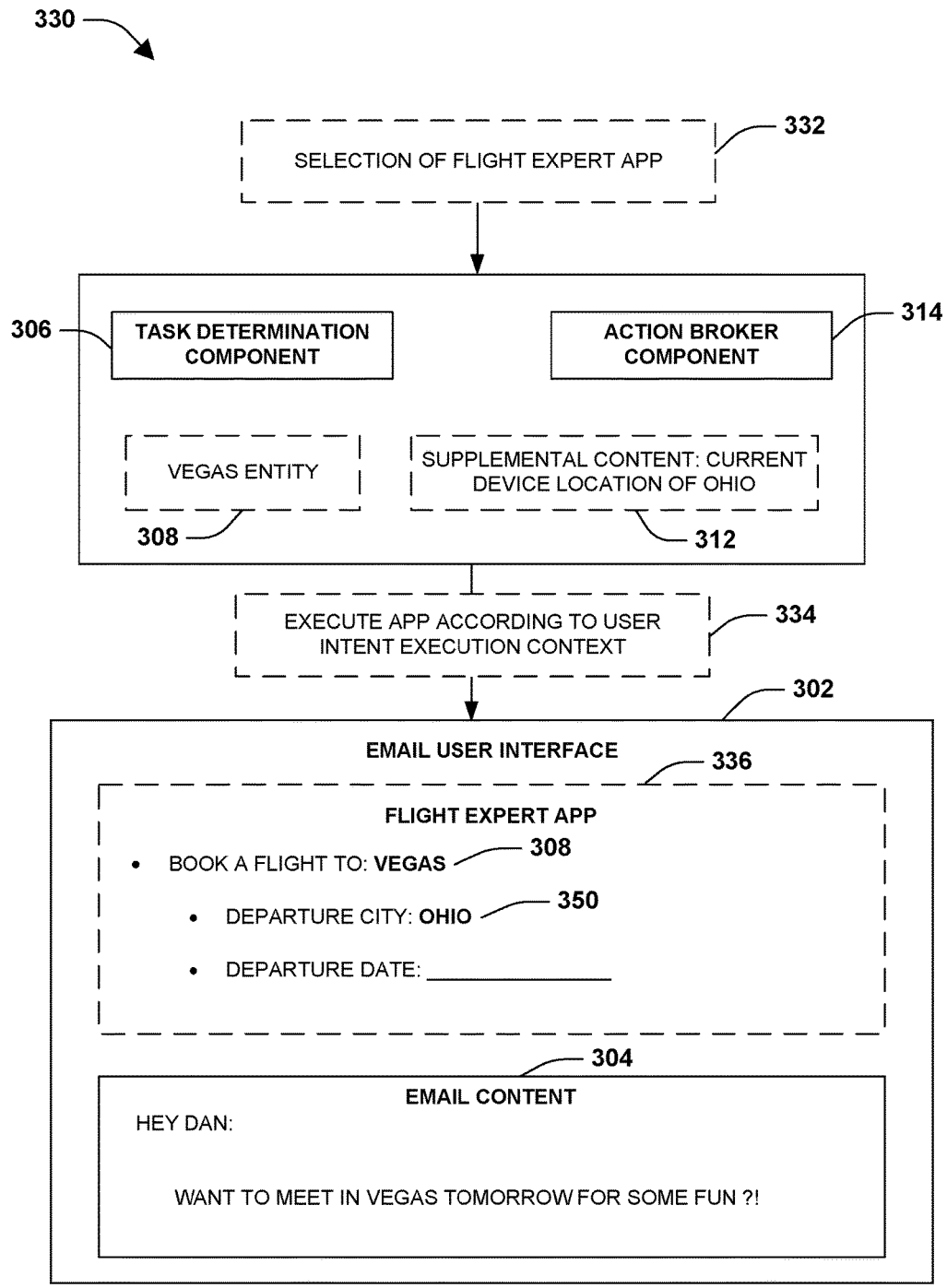
FIG. 3B is a component block diagram illustrating an exemplary system for providing a third party app through an email user interface.

FIG. 3B illustrates an example of a system 330 configured for providing a third party app through an email user interface 302. It may be appreciated that in an example, the system 330 corresponds to the system 300 of FIG. 3A. For example, the system 330 may comprise a task determination component 306 and/or an action broker component 314. The system 330 may be associated with the email user interface 302 configured to provide access to one or more emails, such as an email comprising email content 304. In an example, the task determination component 306 may have identified a Vegas entity 308 associated with the email content 304 and/or may have identified supplemental content 312, such as a current location of a device hosting the email user interface 302. The action broker component 314 may have presented one or more third party apps capable of performing an action to accomplish a task associated with the Vegas entity 308 and/or the supplemental content 312.

The action broker component 314 may be configured to receive a selection 332 of a third party app presented through the email user interface 302 (e.g., a user may select a flight expert app 336, capable of performing a book flight action (e.g., 318 FIG. 3A), from an action selection interface (e.g., 316 FIG. 3A) displayed through the email user interface 302). The action broker component 314 may be configured to execute 334 the third party app within the email user interface 302. For example, the action broker component 314 may execute 334 a flight expert app 336 within the email user interface 302. The flight expert app 336 may be executed according to a user intent execution context corresponding to the Vegas entity 308, the book flight action (e.g., 318 FIG. 3A), and/or the supplemental content 312. For example, the flight expert app 336 may utilize a destination city parameter, a departure city parameter, a departure date, and/or other parameters not illustrated in order to perform the book flight action 318. A value of Vegas, identified by the Vegas entity 308, may be assigned to the destination city parameter. A value of Ohio 350, identified by the supplemental content 312, may be assigned to the departure city parameter. The destination city parameter and the departure city parameter may be included within the user intent execution context. The user intent execution context may be passed to the flight expert app 336 for execution. In this way, the flight expert app 336 may be opened to a state that may be contextually relevant to the user (e.g., the flight expert app 336 may be opened to a flight reservation action form having Vegas and Ohio already populated within the flight reservation action form).

Figure 4A:
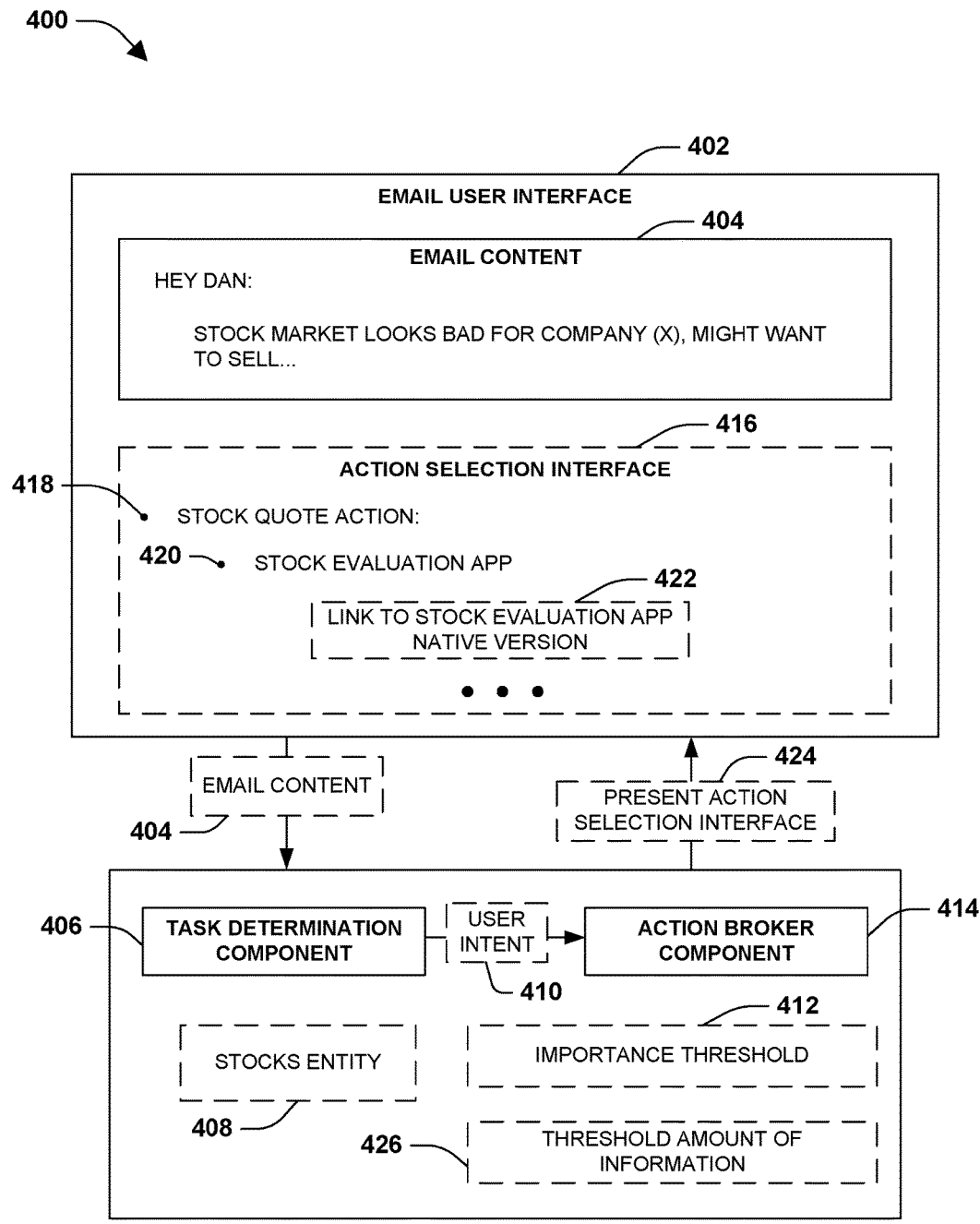
FIG. 4A is a component block diagram illustrating an exemplary system for providing access to a third party app native version executed according to a user intent execution context derived from email content.

FIG. 4A illustrates an example of a system 400 configured for providing access to a third party app native version executed according to a user intent execution context derived from email content. The system 400 may comprise a task determination component 406 and/or an action broker component 414. The system 400 may be associated with an email user interface 402 configured to provide access to one or more emails, such as an email comprising email content 404. The task determination component 406 may be configured to analyze the email content 404 (e.g., text of the email content 404 may be parsed) to identify one or more entities. For example, a stock entity 408 and/or other entities may be identified based upon the email content 404. The task determination component 406 may be configured to determine a user intent 410 to accomplish one or more tasks based upon the stock entity 408, the email content 404, and/or supplemental content (e.g., a user profile indicating that the user owns a significant amount of stock of Company (X)). In an example, a stock quote task, a sell stock task, and/or other tasks may be determined.

The action broker component 414 may be configured to identify one or more actions that may be used to accomplish the one or more tasks. For example, a stock quote action 418 may be used to accomplish the stock quote task and/or the sell stock task. The action broker component 414 may be configured to present the one or more actions through the email user interface 402 (e.g., presenting 424 through an action selection interface 416 hosted within the email user interface 402). The action broker component 414 may be configured to identify one or more third party apps capable of performing the one or more actions. In an example, a stock evaluation app 420 may be identified as being capable of performing the stock quote action 418. In this way, the action broker component 414 may present the one or more third party apps within the email user interface 402 without transitioning a user away from an immersive email experience provided by the email user interface 402 (e.g., presenting 424 through the action selection interface 416).

In an example, the sell stock task may be determined as corresponding to an importance threshold 412 and/or a threshold amount of information 426. In an example of the importance threshold 412, an importance metric for the sell stock task (e.g., a metric value based upon an importance feature for the sell stock task and/or based upon supplemental content indicating that the user owns over a certain dollar amount of Company (X) stock) may exceed the importance threshold 412. In an example of the threshold amount of information 426, a content volume metric for the sell stock task (e.g., based upon an amount of information that is to be presented to the user to accomplish the sell stock task, such as company records, public announcements, price history data, stock forecasts, user comments, and/or a variety of the information) may exceed the threshold amount of information 426. Accordingly, a link 422 to a third party app native version (e.g., a desktop version, a mobile operating system version, and/or a website version of the stock evaluation app, etc.) that is capable of executing outside of the email user interface 402 may be presented. In this way, if the stock evaluation app 420 is unable to provide the user with a robust experience (e.g., unable to display an adequate amount of information) through the email user interface 402, then the user may utilize the link 422 to access the stock evaluation app native version (e.g., illustrated in FIG. 4B).

Figure 4B:
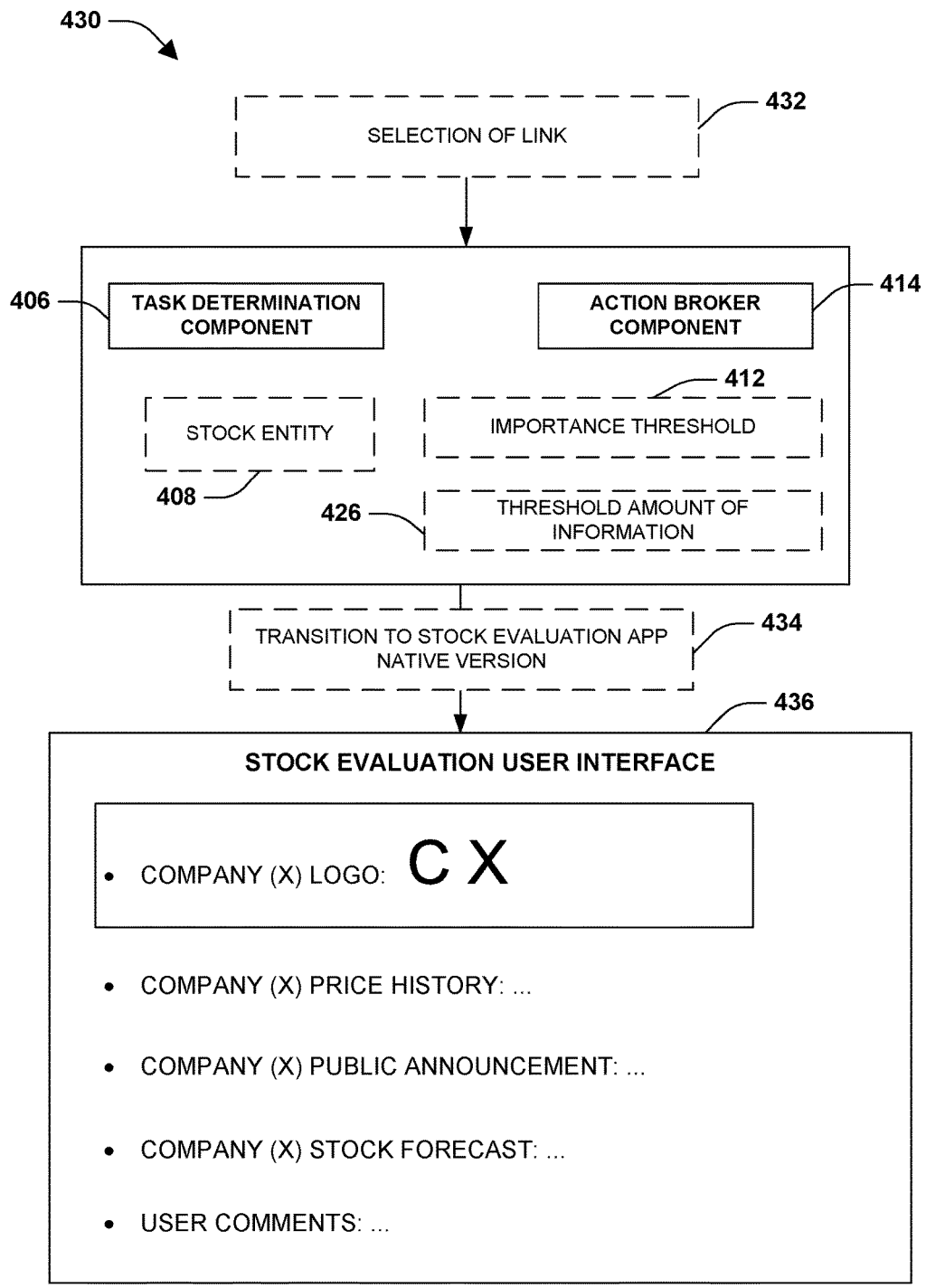
FIG. 4B is a component block diagram illustrating an exemplary system for providing access to a third party app native version executed according to a user intent execution context derived from email content.

FIG. 4B illustrates an example of a system 430 configured for providing access to a third party app native version executed according to a user intent execution context derived from email content. It may be appreciated that in an example, the system 430 corresponds to the system 400 of FIG. 4A. For example, the system 430 may comprise a task determination component 406 and/or an action broker component 414. The system 430 may be associated with an email user interface (e.g., 402 FIG. 4A) configured to provide access to one or more emails, such as an email comprising email content (e.g., 404 FIG. 4A). In an example, the task determination component 406 may have identified a stock entity 408 associated with the email content 404, and the action broker component 414 may have presented one or more third party apps capable of performing an action to accomplish a task associated with the stock entity 408. The action broker component 414 may have presented a link (e.g., 422 FIG. 4A) to a stock evaluation native app (e.g., stock evaluation user interface 436) capable of executing outside the email user interface. The link may have been presented based upon a sell stock action, associated with the stock entity 408, corresponding to an importance threshold 412 (e.g., the sale of stock in Company (X) may exceed some threshold valuation) and/or a threshold amount of information 426 (e.g., the sale of stock in Company (X) may entail presenting a user with a relatively large volume of information that may not be adequately presented through the email user interface).

The action broker component 414 may be configured to receive a selection 432 of the link presented through the email user interface (e.g., 402 FIG. 4A). In an example where a stock evaluation app is not already executing through the email user interface, a user may be redirected from the email user interface to the stock evaluation user interface 436 executing outside of the email user interface. In an example where the stock evaluation app is already executing through the email user interface, the execution of the stock evaluation app within the email user interface may be transitioned 434 to an execution of the stock evaluation app within the stock evaluation user interface 436 executing outside of the email user interface.

A user intent execution context may be passed to the stock evaluation user interface 436 for execution. The user intent execution context may comprise one or more parameters having values derived from the email content (e.g., the stock entity 408, a Company (X) entity, etc.) and/or supplemental content (e.g., shareholder information for the user accessible through a device hosting the email user interface). In this way, the stock evaluation user interface may be opened to an immersive state that may be contextually relevant to the user (e.g., the stock evaluation user interface 436 may display information associated with the Company (X) entity as opposed to generic stock information)

Figure 5:
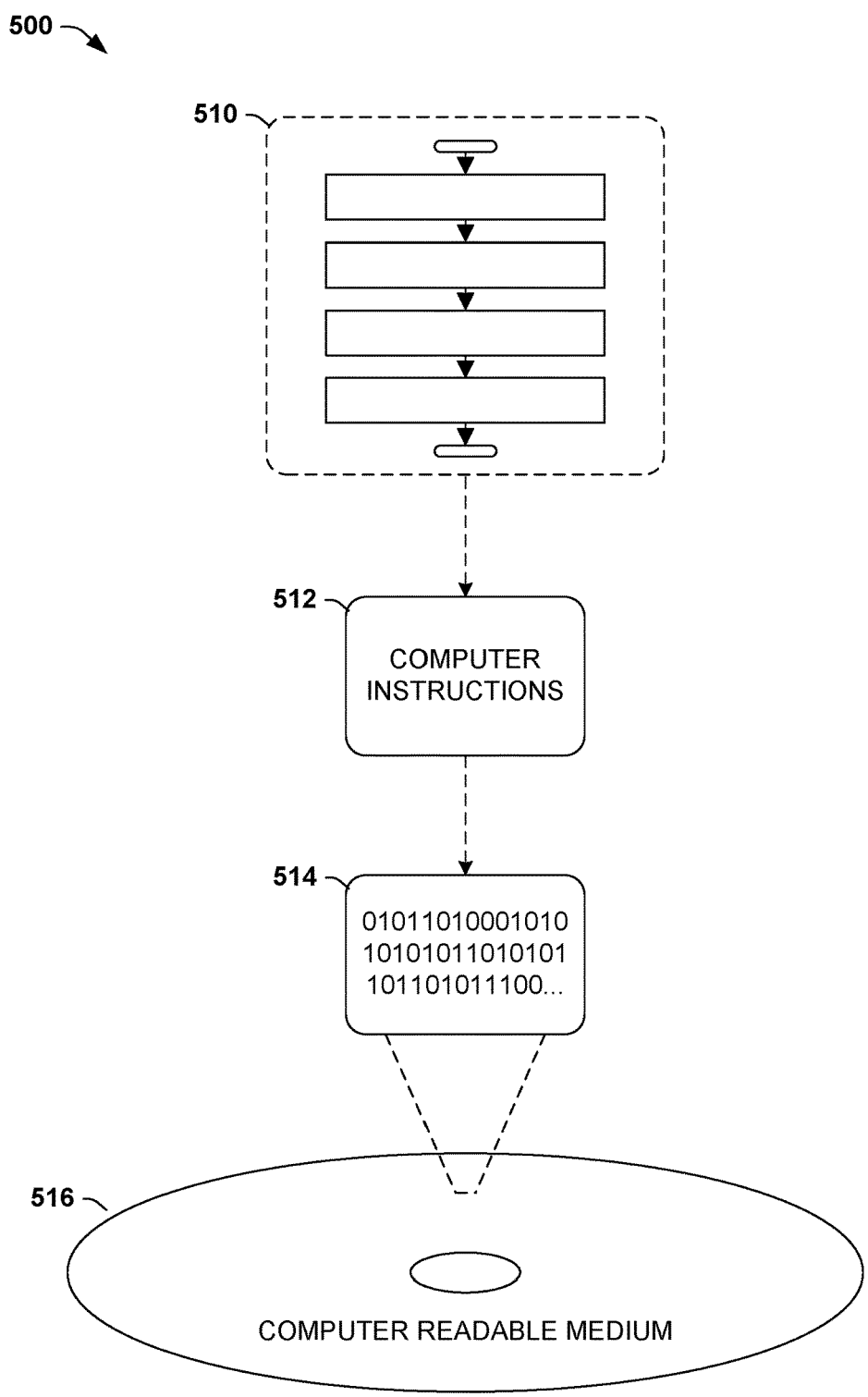
FIG. 5 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 516 (e.g., a CD-R, DVD-R, or a platter of a hard disk drive), on which is encoded computer-readable data 514. This computer-readable data 514 in turn comprises a set of computer instructions 512 configured to operate according to one or more of the principles set forth herein. In one such embodiment 500, the processor-executable computer instructions 512 may be configured to perform a method 510, such as at least some of the exemplary method 100 of FIG. 1, for example. In another such embodiment, the processor-executable instructions 512 may be configured to implement a system, such as at least some of the exemplary system 200 of FIG. 2A, at least some of the exemplary system 230 of FIG. 2B, at least some of the exemplary system 300 of FIG. 3A, at least some of the exemplary system 330 of FIG. 3B, at least some of the exemplary system 400 of FIG. 4A, and/or at least some of the exemplary system 430 of FIG. 4B, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
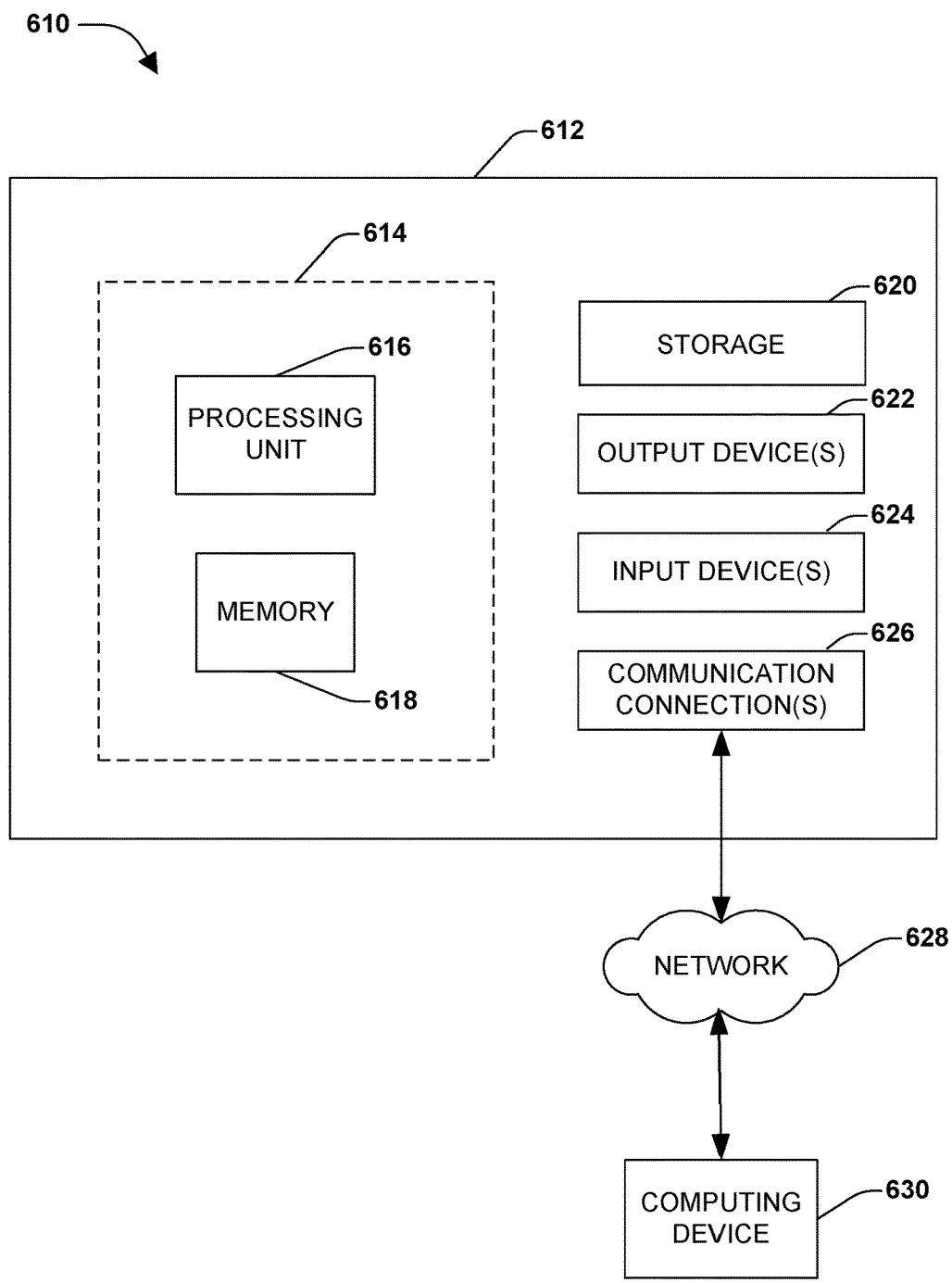
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In an embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In an embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an"

as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing predicted actions through an email user interface, comprising:
   analyzing e-mail content to determine two or more actions to be performed, wherein analyzing email content includes determining a user intent;
   based on the analysis, displaying, within the e-mail user interface, a first selectable link to a first third-party service to complete a first determined action from the determined two or more actions;
   based on the analysis, displaying, within the e-mail user interface, a second selectable link to a second third-party service to complete a second determined action from the determined two or more actions;
   receiving a selection of the first selectable link; and
   upon receiving the selection of the first selectable link, causing the first third-party service to be launched outside of the e-mail user interface.

2. The method of claim 1, wherein the displaying the second selectable link is based on an importance metric exceeding an importance threshold.

3. The method of claim 2, wherein the importance threshold is based on a threshold amount of information to be presented.

4. The method of claim 1, further comprising:
   identifying, in the e-mail content, a parameter used for execution of the first determined action; and
   passing the parameter to the first third-party service.

5. The method of claim 1, further comprising selecting the first third-party service based upon supplemental content derived from at least one of information associated with a user device hosting the email user interface, a user profile, or a user preference.

6. The method of claim 1, wherein the first third-party service and the second third-party service provide functionality associated with at least one of a consumer good purchase task, a reservation task, an obtain directions task, an access digital content task, a social network task, or an obtain additional information related to the entity task.

7. The method of claim 1, further comprising:
   receiving a selection of the second selectable link;
   in response to receiving a selection of the second selectable link, displaying the third party application within a first portion of the email user interface; and
   displaying the email content within a second portion of the email user interface.

8. A method for providing predicted actions through an email user interface, comprising:
   analyzing e-mail content to determine a first action to be performed, wherein analyzing email content includes determining a user intent based on at least one of: textual email content and user context data;
   identifying an importance metric for the determined first action;
   comparing the importance metric for the determined action to an importance threshold for the determined first action;
   based on the comparison of the importance metric to the importance threshold, displaying, within the e-mail user interface, a first selectable link to a first third-party service to complete the first determined action;
   receiving a selection of the first selectable link; and
   upon receiving the selection of the first selectable link, causing the first third-party service to be launched.

9. The method of claim 8, wherein the first third-party service to be launched outside of the e-mail user interface.

10. The method of claim 8, further comprising:
    analyzing the e-mail content to determine a second action to be performed; and
    displaying, within the e-mail user interface, a second selectable link to a second third-party service to complete a second determined action.

11. The method of claim 8, further comprising:
    identifying, in the e-mail content, a parameter used for execution of the first determined action; and
    passing the parameter to the first third-party service.

12. The method of claim 8, further comprising selecting the first third-party service based upon supplemental content derived from at least one of information associated with a user device hosting the email user interface, a user profile, or a user preference.

13. The method of claim 8, wherein the first third-party service provides functionality associated with at least one of a consumer good purchase task, a reservation task, an obtain directions task, an access digital content task, a social network task, or an obtain additional information related to the entity task.

14. A system for providing predicted action through an email user interface, the system comprising:
    at least one processor, and
    memory storing instructions that when executed by the at least one processor perform a set of operations comprising:
    analyzing e-mail content to determine two or more actions to be performed;
    based on the analysis, displaying, within the e-mail user interface, a first selectable link to a first service, capable of providing a first non-e-mail related functionality, to complete a first determined action;
    based on the analysis, displaying, within the e-mail user interface, a second selectable link to a second service, capable of providing a second non-e-mail related functionality, to complete a second determined action, wherein the first determined action is different from the second determined action, and the first non-email related functionality is different from the second non-e-mail related functionality;

receiving a selection of the first selectable link; and upon receiving the selection of the first selectable link, causing the first service to be launched outside of the e-mail user interface.

15. The system of claim 14, wherein the displaying the second selectable link is based on an importance metric exceeding an importance threshold.

16. The system of claim 15, wherein the importance threshold is based on a threshold amount of information to be presented.

17. The system of claim 14, wherein the operations further comprise:

identifying, in the e-mail content, a parameter used for execution of the first determined action; and passing the parameter to the first service.

18. The system of claim 14, wherein the operations further comprise selecting the first service based upon supplemental content derived from at least one of information associated with a user device hosting the email user interface, a user profile, or a user preference.

19. The system of claim 14, wherein the first service and the second service provide functionality associated with at least one of a consumer good purchase task, a reservation task, an obtain directions task, an access digital content task, a social network task, or an obtain additional information related to the entity task.

20. The system of claim 14, wherein the operations further comprise:

receiving a selection of the second selectable link;

in response to receiving a selection of the second selectable link, displaying the second service within a first portion of the email user interface; and displaying the email content within a second portion of the email user interface.

* * * * *